United States Patent [19]

Sanders

[11] Patent Number: 5,182,654
[45] Date of Patent: * Jan. 26, 1993

[54] METHOD AND APPARATUS FOR OBTAINING IDENTICAL OUTPUT SIGNALS FROM TIME BASE CORRECTOR UNIT HAVING VARIABLE OR DIFFERENT ELECTRICAL CHARACTERISTICS USING A VIDEO TAPE OF KNOWN PARAMETERS

[76] Inventor: Glenn Sanders, 17-12 Bellaire Ave., Fairlawn, N.J. 07410

[*] Notice: The portion of the term of this patent subsequent to Jul. 30, 2008 has been disclaimed.

[21] Appl. No.: 482,640

[22] Filed: Feb. 21, 1990

[51] Int. Cl.$^5$ .................................... H04N 9/89
[52] U.S. Cl. ........................ 358/320; 358/327; 360/25; 360/36.2
[58] Field of Search ............. 358/320, 323, 324, 337, 358/338, 10, 139, 148, 327, 315–316, 318; 360/25, 27, 36.1, 36.2, 65, 67

[56] References Cited

U.S. PATENT DOCUMENTS

| | | | |
|---|---|---|---|
| 4,583,134 | 4/1986 | Nakamichi | 360/27 X |
| 4,706,108 | 11/1987 | Kumagai et al. | 358/10 |
| 5,036,406 | 7/1991 | Sanders | 360/25 |

Primary Examiner—Wayne R. Young
Attorney, Agent, or Firm—Abelman Frayne & Schwab

[57] ABSTRACT

A set of offset signal values is obtained for use with a time base corrector unit which is capable of playing a video tape to produce a corresponding output video signal containing various viewing parameters such as video gain, chroma gain, set up and hue. A tape having a known set of parameter values and carrying test patterns is used together with a source of a standard reference video signal, and a source of a variable offset signal. The viewing parameter settings of the unit are adjusted to conform to the known set of parameter values. The tape is played in the unit, thus displaying the test pattern video output signal. The output signal is displayed with the reference signal, the reference signal containing the same parameters but with different values. An offset signal is applied to the input of the unit. The offset signal is varied to vary the video output signal for each parameter in turn until each parameter of the varied output signal is visually identical to that of the standard reference signal, thereby obtaining a set of offset signal values associated with the unit, each value in the set being associated with a different parameter.

7 Claims, 3 Drawing Sheets

000
METHOD AND APPARATUS FOR OBTAINING IDENTICAL OUTPUT SIGNALS FROM TIME BASE CORRECTOR UNIT HAVING VARIABLE OR DIFFERENT ELECTRICAL CHARACTERISTICS USING A VIDEO TAPE OF KNOWN PARAMETERS

CROSS REFERENCE TO COPENDING APPLICATION

This application is related to copending application entitled "METHOD AND APPARATUS FOR OBTAINING IDENTICAL OUTPUT SIGNALS FROM NOMINALLY IDENTICAL TIME BASE CORRECTOR UNITS HAVING SLIGHTLY DIFFERENT CHARACTERISTICS", Ser. No. 482,631, filed on even date herewith now issued as U.S. Pat. No. 5,036,406. Both applications are in the name of the same inventor.

Any details not contained herein which explain the method and apparatus disclosed in the copending application and are needed to explain the method and process described in this application are incorporated by reference herein.

BACKGROUND OF THE INVENTION

As explained in the above mentioned copending application, a time base corrector [TBC] unit is a video processing device. It is a unit which can be built into a video tape recorder or can be used separately with such recorder. When video tapes are edited, the tapes must be played. Each time a tape is played on a video tape recorder, it is necessary to adjust several parameters of the associated TBC, such as video gain, chroma gain, setup and hue, so that the values of these parameters used in playing the tape the first time will be unaltered when the tape is played again. If the values are changed, the tape cannot be properly edited.

All TBC units are nominally identical. However, because of manufacturing tolerances and the like, no two units have identical electrical characteristics so that parameter settings used for play of one tape on one unit will differ from the settings needed to play the same tape on another unit in such manner that the tape can be properly edited.

The copending application discloses both a new and improved method and a new and improved apparatus for overcoming these differences in electrical characteristics, thus enabling a tape to be played for editing on any one of a plurality of TBC units without changing parameter settings each time this tape or any other tape is to be so played. In particular, an offset memory contains a separate set of offset signal values associated with each unit and a tape memory contains a separate set of parameter values associated with each tape. Then, by using data obtained from both memories, any one of these tapes can be played in any of the units with identical results.

However, it is often necessary to play a tape having a known set of tape parameters in the tape memory on a TBC unit having unknown offset signal values. In addition, a TBC unit may also be subject to drift, that is, over an extended period of time such as several months, the electrical characteristics of the same unit may change somewhat with time. As a consequence, even when the unit previously had known offset signal values as determined in the manner taught in the copending application, the same tape played on the same unit after drift has occurred will not play properly until a new set of offset signal values are obtained for the unit in order to compensate for drift.

SUMMARY OF THE INVENTION

It is an object of the present invention to provide a new and improved method and new and improved apparatus for using a tape having a predetermined set of parameter values associated therewith for obtaining offset signal values for a TBC unit having unknown offset signal values, the values being unknown because the signal offset values for this unit has never been obtained previously.

Another object to provide a new and improved method and new and improved apparatus for using a tape having a predetermined set of parameter values associated therewith for obtaining offset signal values for a TBC unit having unknown offset signal values, the values being unknown because, although the offset values for this unit had been obtained previously, these values had changed because of drift.

These and other objects and advantages of this invention will either be explained or will become apparent hereinafter.

In accordance with the principles of this invention, both the method and the apparatus are adapted for use with a time base corrector unit to measure a set of offset signal values to be associated with this unit. The unit is capable of playing a video tape to produce a corresponding output video signal containing various viewing parameters such as video gain, chroma gain, set up and hue. A tape having a known set of parameter values and carrying test patterns is employed together with a source of a standard reference video signal, and a source of a variable offset signal.

The set of parameter values associated with this tape are obtained from a tape memory containing this set of values. The viewing parameter settings of the unit are adjusted to conform to the known set of parameter values. The tape is played in the unit, thus displaying a test pattern video output signal. This output signal is displayed together with the reference signal, the reference signal containing the same parameters but with different values. An offset signal is supplied to the input of the unit. The offset signal is varied for each parameter in turn until the said each parameter of the varied output signal is visually identical to that of the standard reference signal, thereby obtaining a set of offset signal values associated with the unit, each value in the set being associated with a different parameter. This set can then be used, stored or otherwise disposed of.

DETAILED DESCRIPTION OF PREFERRED EMBODIMENTS

Figure 1:
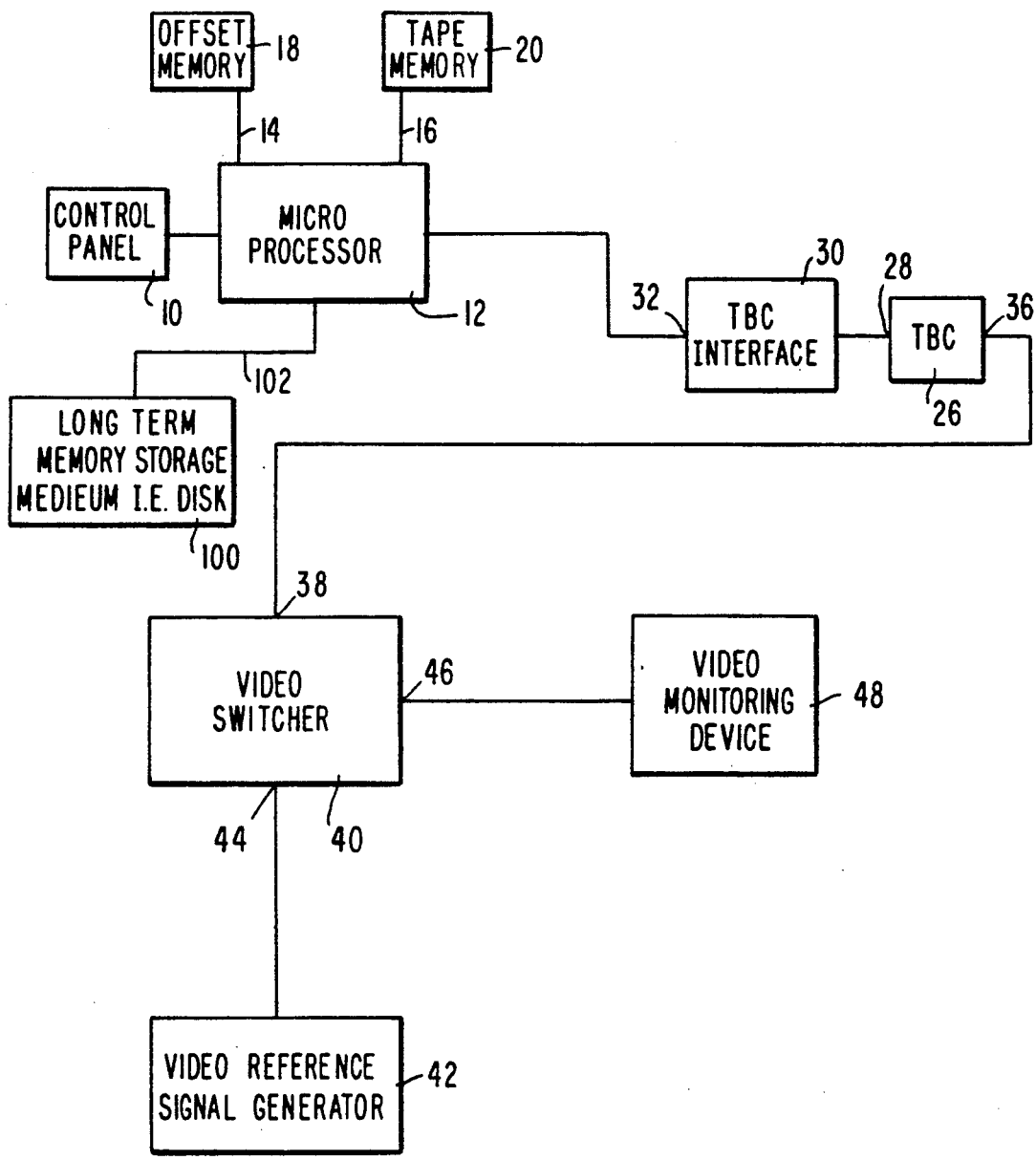
FIG. 1 is a block diagram of the apparatus employed in a preferred embodiment of the invention.

Referring first to FIG. 1, there is shown a control panel 10 which is manufactured and sold in commerce by ZAXCOM VIDEO Corporation of Garfield, N.J. The output of the panel is connected to an input of micro processor 12. The panel is sometimes sold in combination with this micro processor. The processor 12 receives input signals in digital form and produces output signals in digital form. The processor connected via corresponding leads 14 and 16 to a first offset signal memory 18 and to a second tape memory 20 so that signals from the processor can fed into the memories and data from the memories can be fed into the processor.

Memory 18 contains sets of preexisting offset signal values associated with each TBC unit and memory 20 contains sets of preexisting tape data associated with each tape, the data having been recorded in these memories in the manner described in the aforementioned copending application.

A TBC unit 26 with unknown offset signal values or with offset signal values which are incorrect because of drift is connected at corresponding input 28 to a corresponding output of corresponding interface 30 which is either a digital or an analog interface, depending upon the digital or analog type of unit used. The interface is connected at its input 32 to a corresponding digital output 34 of the processor. The purpose of the interfaces is to insure compatability between the output signals from the processor and the input signals to the unit.

A long term memory 100, utilizing for example disc storage, contains the same data as memory 20. Data from this memory can be accessed via lead 102 by the microprocessor in the same manner as as data from memories 18 and 20.

Unit 26 has an output 36 connected to an input 38 of a video switcher 40. A standard reference video signal, containing for example, color bars at specified gain levels, produced by a video test signal generator of known type 42 is supplied to another input of the switcher. The output 46 of the switcher is a mixed video signal which is supplied to a video monitor 48.

Figure 3:
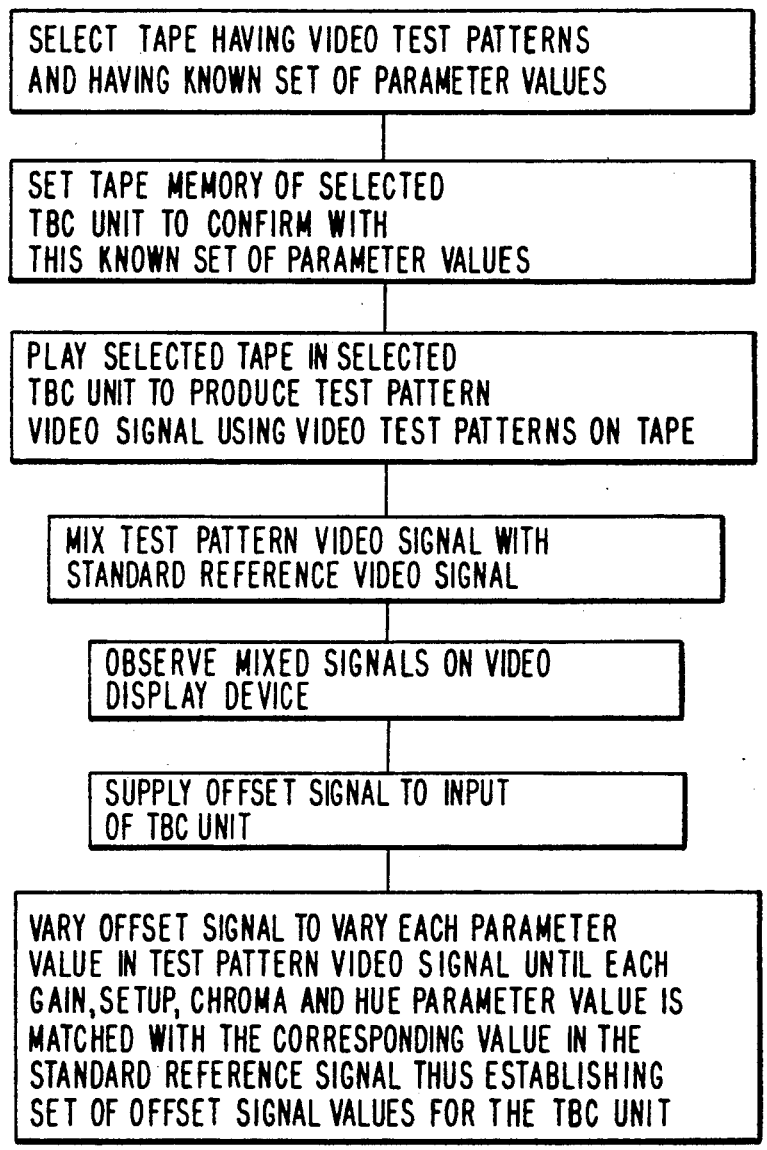
FIG. 3 is a flow chart illustrating the steps employed in the method utilized in a preferred embodiment of the invention.

As shown in FIG. 3, a tape to be played which has a known set parameter signal values as contained in the tape memory is selected. The tape memory of the TBC unit is set using this parameter settings as called up from memory 100 by the micro processor and then and electrically set by the microprocessor applying suitable input signals to the unit.

The tape is then played in the unit. This tape contains normal video images and displays at the very start, video test patterns. The test pattern video signal is mixed with the standard reference video signal in the switcher. The resultant mixed signal output contains both the test pattern video signal and reference video signal which are displayed side by side in the video monitor. The signals differ.

Under the control of the panel, an offset signal is supplied to the input of the unit to adjust the test pattern video signal to be identical with the reference video signal. Normally, there are four different parameters, video gain, video set up, video chroma and video hue, and a separate offset signal value, which will normally differ one from another for each of the different parameters, is obtained for each parameter. The resultant set of offset signal values can used, stored, or otherwise disposed of.

Figure 2:
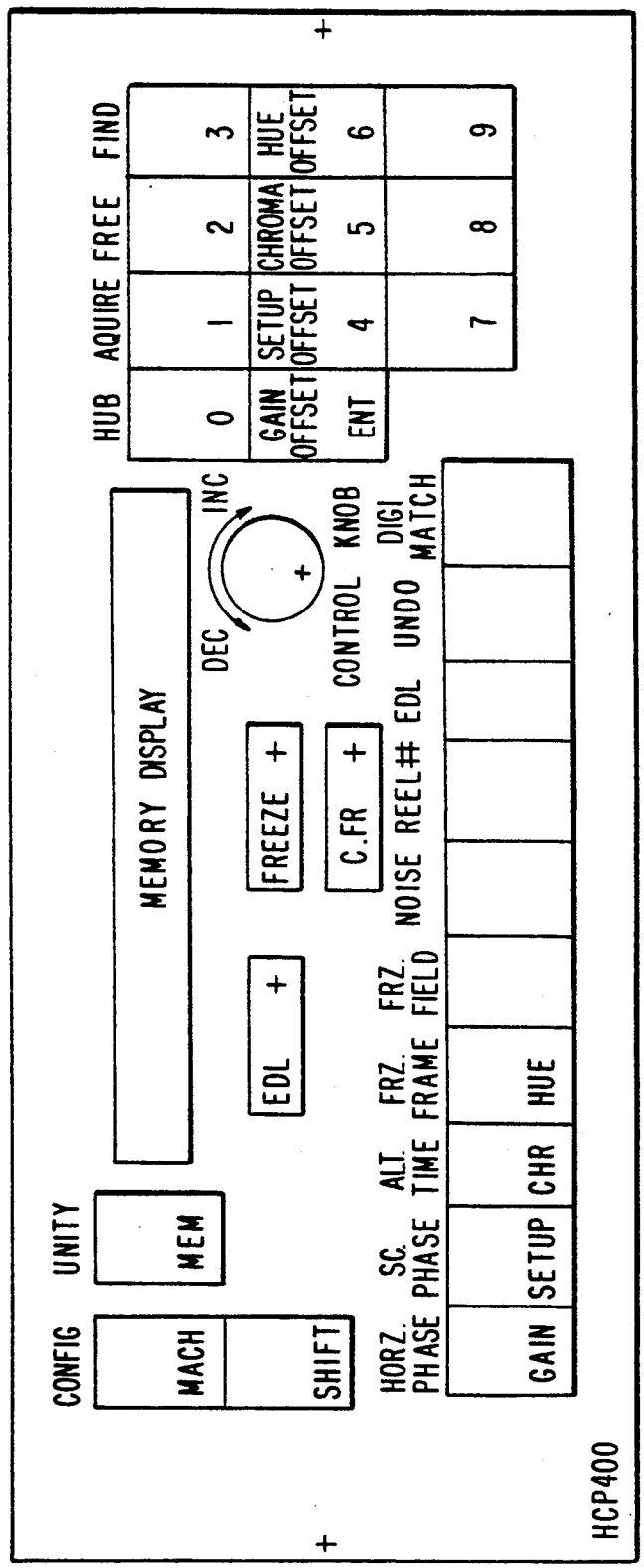
FIG. 2 is a detail view of the face panel of a control unit used in the apparatus of FIG. 2.

The control panel is shown in FIG. 2. The various controls are identified and their functions explained as follows.

GAIN, SETUP, CHR, and HUE—these buttons respectively select video gain, setup, chroma and hue as the selected parameter to be altered.

The control knob will increment or decrement the parameter being altered. It will also change the memory when the memory [MEM] increment button was the last button pressed.

The memory increment button will step through the fifty memories per TBC. AS this button is pressed, the memory number in this group will be displayed in the two digit memory display. Holding this button will result in a continuous increment of the memories. By pressing the memory number on the key pad and then the memory increment button, the memories can be accessed randomly.

Parameters other than those identified above can be dealt with in the same manner as taught herein. Similarly, video processors are controlled in the same manner as TBC units and can be adjusted in the same manner as taught herein.

While the invention has been described with particular reference to the preferred embodiment and to the drawings, the protection sought is to be limited only by the terms of the claims which follow.

What is claimed is:

1. A method adapted for use with a time base corrector unit to obtain a set of offset signal values to be associated with this unit, the unit being capable of playing a video tape to produce a corresponding output video signal containing the viewing parameters video gain, chroma gain, set up and hue, the method employing a tape having a known set of parameter values and carrying test patterns, a source of a standard reference video signal, and a source of a variable offset signal, said method comprising the steps of:
   [a] adjusting the viewing parameter settings of the unit to conform to the known set of parameter values;
   [b] playing the tape in the unit, thus producing a test pattern video output signal;
   [c] displaying the output signal together with the reference signal, the reference signal containing the same parameters but with different values;
   [d] applying an offset signal to the input of the unit; and
   [e] varying the offset signal to vary the video output signal for each parameter in turn until the said each parameter of the varied output signal is visually identical to that of the standard reference signal, thereby obtaining a set of offset signal values associated with the unit, each value in the set being associated with a different parameter.

2. The method of claim 1 including the initial step of obtaining the set of known parameter values from a tape memory containing said set of values associated with said tape.

3. The method of claim 2 wherein the unit prior to being subject to this method had unknown offset signal values.

4. The method of claim 2 wherein the unit had known offset signal values but after these values had become known, the unit was subjected to drift.

5. Apparatus adapted for use with a time base corrector unit to obtain a set of offset signal values to be associated with this unit, the unit being capable of playing a video tape to produce a corresponding video signal containing the viewing parameters video gain, chroma gain, set up and hue, the apparatus employing a tape having a known set of parameter values and carrying test patterns, the apparatus comprising:

[a] a signal comparator having a first input to which a test pattern video output signal can be supplied and a second input to which a standard reference video signal containing the same parameters but at different values can be supplied, the comparator having an output at which both the test pattern video signal and the reference signal appear as a mixed video signal;

[b] first means coupled to an input of the unit to set it to play said tape using the known set of parameter values, the unit then playing the tape and producing the test pattern video signal, the test pattern video signal being supplied to the first input of the comparator;

[c] second means to supply the reference video signal to the second input of the comparator;

[d] a display device having an input coupled to the output of the comparator and responsive to the mixed signal to display same as a composite; and

[e] third means producing an offset signal variable in value, the variable offset signal being applied to the input of the unit, the offset value being adjusted for each parameter in turn to set the parameter value of the test pattern video signal to be identical to the value of the same parameter contained in the reference signal.

6. The apparatus of claim 5 wherein said first means includes a tape memory in which said known set of parameter values is stored.

7. The apparatus of claim 6 wherein said second means includes a test signal generator.

* * * * *